United States Patent
Karasawa

(10) Patent No.: US 8,204,373 B2
(45) Date of Patent: Jun. 19, 2012

(54) IMAGE PICKUP APPARATUS WITH BUILT-IN FLASH

(75) Inventor: Akira Karasawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/854,556

(22) Filed: Aug. 11, 2010

(65) Prior Publication Data

US 2011/0052172 A1 Mar. 3, 2011

(30) Foreign Application Priority Data

Aug. 27, 2009 (JP) ................................. 2009-196401

(51) Int. Cl.
*G03B 15/03* (2006.01)
*H04N 5/222* (2006.01)

(52) U.S. Cl. ........................................ 396/177; 348/371
(58) Field of Classification Search .................. 396/177, 396/176, 175; 348/371
See application file for complete search history.

(56) References Cited

U.S. PATENT DOCUMENTS

2002/0071673 A1 * 6/2002 Kaihara et al. ................ 396/358

FOREIGN PATENT DOCUMENTS

| GB | 2235057 A | 2/1991 |
|---|---|---|
| JP | 03-059635 A | 3/1991 |

* cited by examiner

*Primary Examiner* — Rochelle-Ann J Blackman
(74) *Attorney, Agent, or Firm* — Cowan, Liebowitz & Latman, P.C.

(57) ABSTRACT

An image pickup apparatus includes a motor, a shutter charge mechanism which rotates the motor in a first direction to perform a charge operation of a shutter, a flash pop-up mechanism which rotates the motor in a second direction to move a flash to an up state, a state detector which detects the up state of the flash, a clutch mechanism which cuts off a transmission between the motor and the flash pop-up mechanism when the motor rotates in the first direction, and cuts off a transmission between the motor and the shutter charge mechanism when the motor rotates in the second direction, and a controller which controls the motor to rotate in the first direction to drive the shutter charge mechanism when the state detector detects the up state of the flash after the motor rotates in the second direction to drive the flash pop-up mechanism.

4 Claims, 6 Drawing Sheets

IMAGE PICKUP APPARATUS WITH BUILT-IN FLASH

BACKGROUND OF THE INVENTION

1. Field of the Invention

The present invention relates to an image pickup apparatus with a built-in flash which has a function of a live view shooting mode.

2. Description of the Related Art

In a conventional camera, in order to pop up a flash built in the camera, a driving force of a motor is switched to be used for the charge of a shutter or a mirror, the release of a locking lever which locks the flash, or the like. There is also a camera in which the release of the locking lever which locks the flash is performed by using a dedicated actuator. Japanese Patent Laid-open No. 03-59635 discloses a drive control apparatus for a camera which is constituted so as to perform operations such as mirror-up, shutter charge, and flash-up operations by using one motor, and also perform the flash-up and a housing operations by one motor without using an actuator dedicated for popping up the flash.

However, in the conventional technology disclosed in Japanese Patent Laid-open No. 03-59635, at the time of a normal shooting, the motor positively rotates to drive a mirror drive mechanism and a charge mechanism. Furthermore, the motor reversely rotates to drive a flash drive mechanism to move a built-in flash to an emitting position. Each mechanism is returned to an initial position after the flash is popped up. However, Japanese Patent Laid-open No. 03-59635 does not disclose a configuration where the built-in flash is driven to the emitting position in a live view shooting mode in which an object image is displayed on a monitor in real time.

When the flash is housed without taking an image after the flash is popped up and a vibration or the like is given in a state where a switch of the camera is off, a phase of the initial position of a cam which performs the charge of the shutter may be displaced to generate an error. In addition, when a release button is turned on in taking the image after the flash is popped up, a large amount of time is required for the actual exposure.

SUMMARY OF THE INVENTION

The present invention provides an image pickup apparatus capable of ensuring a phase of a shutter charge mechanism even if the shutter charge mechanism is decoupled to pop up a flash.

An image pickup apparatus as one aspect of the present invention includes a motor configured to rotate in a first direction and a second direction opposite to the first direction, a shutter charge mechanism configured to rotate the motor in the first direction to perform a charge operation of a shutter, a flash pop-up mechanism configured to rotate the motor in the second direction to move a flash to an up state, a state detector configured to detect the up state of the flash, a clutch mechanism configured to decouple a transmission between the motor and the flash pop-up mechanism when the motor rotates in the first direction, and configured to decouple a transmission between the motor and the shutter charge mechanism when the motor rotates in the second direction, and a controller configured to control the motor so that the motor rotates in the first direction to drive the shutter charge mechanism when the state detector detects the up state of the flash after the motor rotates in the second direction to drive the flash pop-up mechanism.

Further features of the present invention will become apparent from the following description of exemplary embodiments with reference to the attached drawings.

DESCRIPTION OF THE PREFERRED EMBODIMENTS

Figure 1:
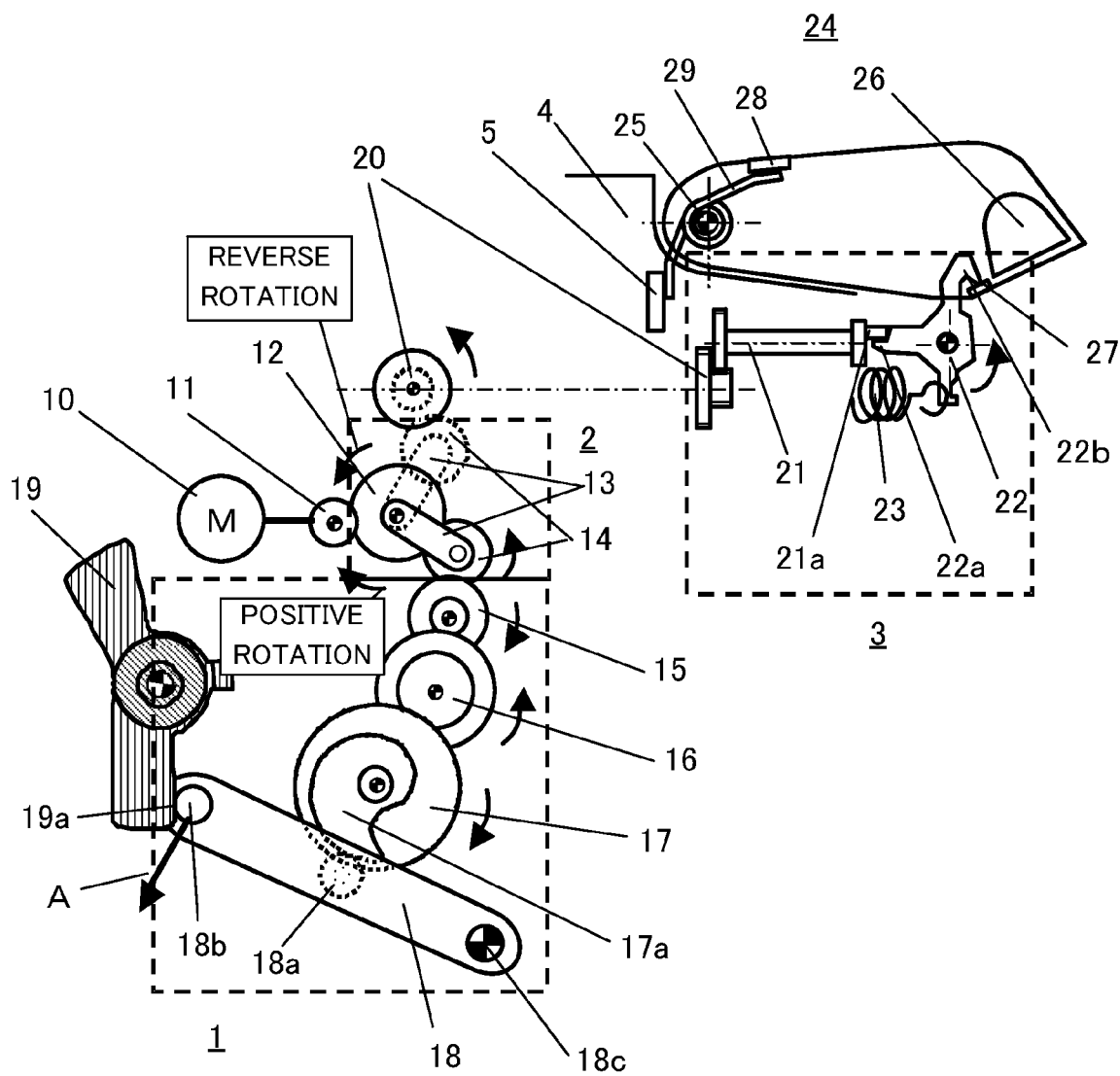
FIG. 1 is a configuration diagram of a shutter charge mechanism and a flash pop-up mechanism in a camera of Embodiment 1.

Exemplary embodiments of the present invention will be described below with reference to the accompanied drawings. In each of the drawings, the same elements will be denoted by the same reference numerals and the duplicate descriptions thereof will be omitted.

Embodiment 1

First of all, a camera in Embodiment 1 of the present invention will be described. FIG. 1 is a configuration diagram of a shutter charge mechanism and a flash pop-up mechanism in the camera of the present embodiment. The camera of the present embodiment is configured so as to be able to take an image in a normal shooting mode in which an object image is observed using an optical finder and in a live view shooting mode in which the object image is displayed on a monitor in real time. Accordingly, the object image is observed in a state where a shutter is closed in the normal shooting mode, and on the other hand, the object image is observed in a state where the shutter is open in the live view shooting mode.

In FIG. 1, reference numeral 1 denotes a shutter charge mechanism, which is constituted of deceleration gears 15 and 16, a cam gear 17, and a charge lever 18. The shutter charge mechanism 1 mainly performs a charge operation for a shutter. When a shutter charge motor 10 (a motor) rotates positively (rotates in a first direction), it rotates the cam gear 17 in an arrow direction in the drawing through a pinion gear 11, a sun gear 12, a planet gear 14, and the deceleration gears 15 and 16. A charge cam 17a formed integrally with the cam gear 17 presses a charge roller 18a provided in the charge lever 18. The charge lever 18 rotates around a rotating shaft 18c in a counterclockwise direction, and presses a contact portion 19a of a shutter lever 19 in a direction indicated by an arrow A using a second charge roller 18b provided at an end of the charge lever 18. The shutter charge lever 19 charges a driving lever which drives a shutter blade (not shown) to charge the shutter.

When the shutter charge motor 10 rotates reversely, i.e. rotates in a second direction opposite to the first direction, the sun gear 12 constituting a planet gear clutch 2 (a clutch mechanism) rotates in a reversed arrow direction. Additionally, the planet gear 14 rotates around the sun gear 12 in the counterclockwise direction along with a planet arm 13, and engages with a flash driving gear 20 as indicated by dotted lines in the drawing.

Reference numeral 3 denotes a flash lock releasing mechanism, which is constituted of a flash driving gear 20, a hook releasing gear 21, a flash hook 22, and a hook returning spring 23. The flash lock releasing mechanism 3 releases the lock of a built-in flash 24 to pop up the flash. The flash driving gear 20 rotates the hook releasing gear 21. When a hook releasing pin 21*a* presses a pin contact portion 22*a* of the flash hook 22 to drive the flash hook 22 in the counterclockwise direction against the hook returning spring 23, a locking portion 22*b* of the flash hook 22 is released from a locking plate 27.

The built-in flash 24 includes the locking plate 27 which locks the built-in flash 24 against a flash pop-up spring 29 in a down state, a flash light emitter 26, a rotating shaft 25 which is used for popping up the built-in flash 24, and the like. The flash pop-up spring 29 is a torsion spring disposed on the same axis as that of the rotating shaft 25, and one end of the arm contacts a spring receiver 28 in the built-in flash 24 and the other end contacts a spring stopper 5. Therefore, a predetermined force is acted in a direction to pop up the built-in flash 24. A state detecting switch 64 which detects whether the built-in flash 24 is in an up state or a down state is provided at the rotating shaft 25.

As described above, the shutter charge motor 10 rotates in the first direction (a positive rotation direction) to activate the shutter charge mechanism 1, and rotates in the second direction (a reverse rotation direction) opposite to the first direction to activate the flash lock releasing mechanism 3. The planet gear clutch 2 switches a driving force of the shutter charge motor 10 so as to be transferred to one of the shutter charge mechanism 1 and the flash lock releasing mechanism 3. Therefore, even if the flash lock releasing mechanism 3 is driven, the shutter charge mechanism 1 is not driven. Accordingly, the degree of freedom in determining a shape of the charge cam 17*a* can be improved.

Figure 2:
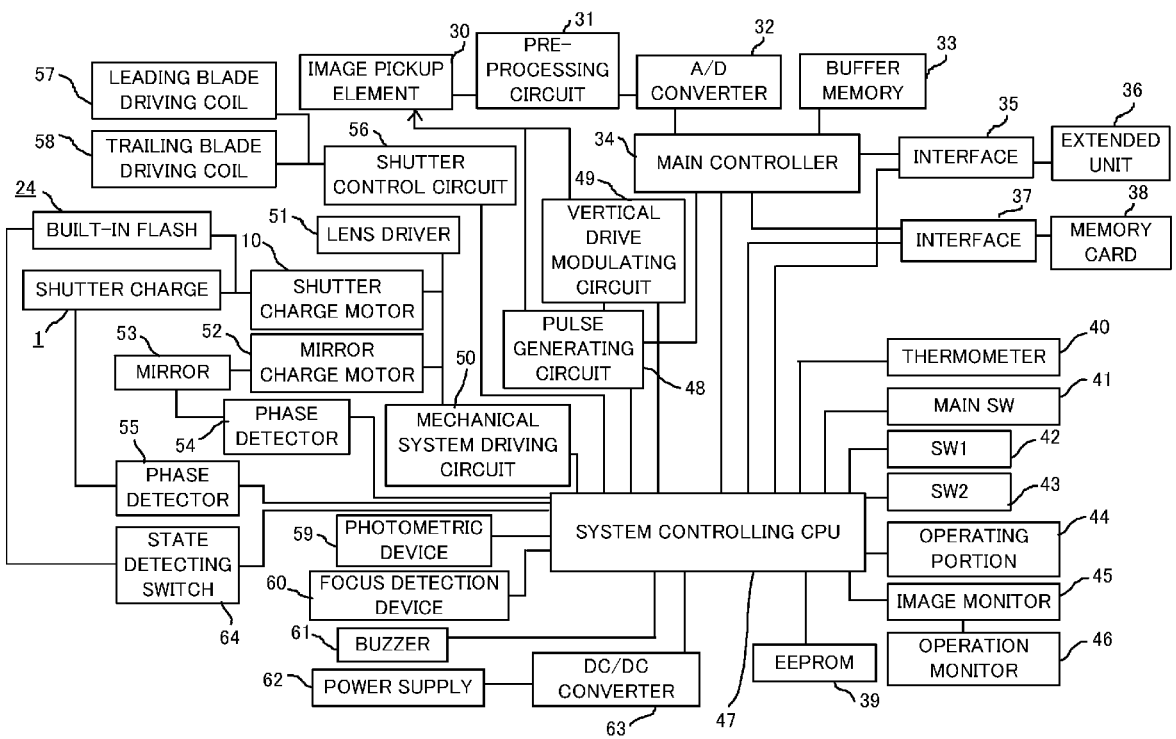
FIG. 2 is an electric block diagram in a camera of Embodiment 1.

FIG. 2 is an electric block diagram in the camera of the present embodiment. In FIG. 2, reference numeral 30 denotes an image pickup element such as a CCD or a CMOS which converts reflected light from an object into an electric signal. Reference numeral 31 denotes a pre-processing circuit, which includes a CDS circuit for removing an output noise of the image pickup element 30 and a non-linear amplification circuit which amplifies a signal before an A/D conversion is performed for the signal. Reference numeral 32 denotes an A/D converter which converts an analog output into a digital signal. Reference numeral 33 denotes a buffer memory, reference numeral 34 denotes a main controller which controls a read/write operation or a refresh operation of the buffer memory 33 or the like, and reference numeral 47 denotes a system controlling CPU which controls a system such as an imaging sequence. Reference numeral 46 denotes an operation monitor which is included in an image monitor 45 and displays information for assisting the operation or on a state of the camera, and reference numeral 44 denotes an operating portion which operates the camera from an outside, which switches the shooting mode.

Reference numeral 35 denotes an interface to an extended unit 36 described below. Reference numeral 36 denotes the extended unit which is arbitrarily detachable, which can be connected with a camera body to perform various kinds of processes or operations. Reference numeral 37 denotes an interface for connecting with a memory card 38 described below, and reference numeral 38 denotes the detachable memory card 38 (a recording medium) which records data obtained from the camera and includes for example a non-volatile solid memory element such as an EEPROM or a flash memory. Reference numeral 39 denotes an EEPROM (an electrically erasable and programmable read only memory) for controlling the camera, and reference numeral 40 denotes a thermometer which measures and holds the temperature inside the camera used for correcting various kinds of controls.

Reference numeral 41 denotes a main switch of the camera for applying the power to the system. Reference numeral 42 denotes a switch (SW1) in which a release button (not shown) is pressed to perform a shooting standby operation such as an automatic focusing function or an automatic exposing function. Reference numeral 43 denotes a shooting switch (SW2) in which the release button is additionally pressed to take an image after the switch 42 (SW1) is turned on. Reference numeral 45 denotes an image monitor such as a liquid crystal device panel which displays the shot image data or an object image in a live view state.

A scan clock or a predetermined control pulse is supplied from a pulse generating circuit 48 to the image pickup element 30. A clock frequency of a vertical scan clock which is one of the scan clocks generated in the pulse generating circuit 48 is modulated into a predetermined frequency by a vertical drive modulating circuit 49 to be inputted to the image pickup element 30. A scan pattern of a reset scan of the electronic leading blade is determined by the vertical drive modulating circuit 49.

Reference numeral 50 denotes a mechanical system driving circuit which drives a lens driver 51, a shutter charge motor 10, a mirror charge motor 52, and the like. The shutter charge motor 10 operates the shutter charge mechanism 1 such as a shooting preparing operation and the charge of the shutter by the rotation in the positive rotation direction, and releases the lock of the built-in flash 24 to pop up the built-in flash by rotation in the reverse rotation direction. The mechanical system driving circuit 50 is controlled by the system controlling CPU 47 (a controller). In other words, in the normal shooting mode, the system controlling CPU 47 controls the shutter to perform a recharge operation when the state detecting switch 64 detects an up state of the built-in flash 24 after the pop-up operation of the flash is performed. On the other hand, in the live view operation mode, the shutter does not perform the recharge operation even if the state detecting switch 64 detects the up state of the built-in flash 24 after the pop-up operation of the flash is performed. Then, the system controlling CPU 47 controls the shutter so as to perform the recharge operation when an exposure operation is performed or the live view shooting mode is changed to the normal shooting mode. The details will be described below.

A mirror charge motor 52 drives and charges a mirror 53. Reference numeral 56 denotes a shutter control circuit that applies current to a leading blade driving coil 57 and a trailing blade driving coil 58 which drive a rotor (not shown) for releasing the lock of shutter blades. The shutter control circuit 56 controls the exposure time for the image pickup element 30. Reference numeral 54 denotes a phase detector which detects a phase used for the control of the mirror charge motor 52 performing a drive or a charge of the mirror 53 or the like. Reference numeral 55 denotes a phase detector which detects a rotational phase of the cam gear 17. A phase signal outputted from the phase detector 55 is used for the control of the shutter charge motor 10 which operates the shutter charge mechanism 1. The phase detector 55 outputs an ON/OFF signal that is outputted by a plurality of conductive contact sections having spring properties which are arranged on a surface opposite to the charge cam 17*a* of the cam gear 17 moving on a pattern constituted of a conduction portion and a non-conduction portion of a phase substrate. In the present embodiment, the phase detector 55 detects rotational phases at two areas of the cam gear 17.

Reference numeral 59 denotes a photometric device for performing an object photometry, and reference numeral 60 denotes a focus detection device for performing a focus detection of the object. Reference numeral 61 denotes an electronic buzzer, which converts various kinds of warnings or operation states into sounds. Reference numeral 63 denotes a DC/DC converter which converts a voltage of a power supply 62 of the camera such as a battery into a constant output voltage, which supplies the converted voltage to each circuit such as the system controlling CPU 47. Reference numeral 64 denotes the state detection switch which detects whether the built-in flash 24 is in the up state or in the down state.

Figure 3A:
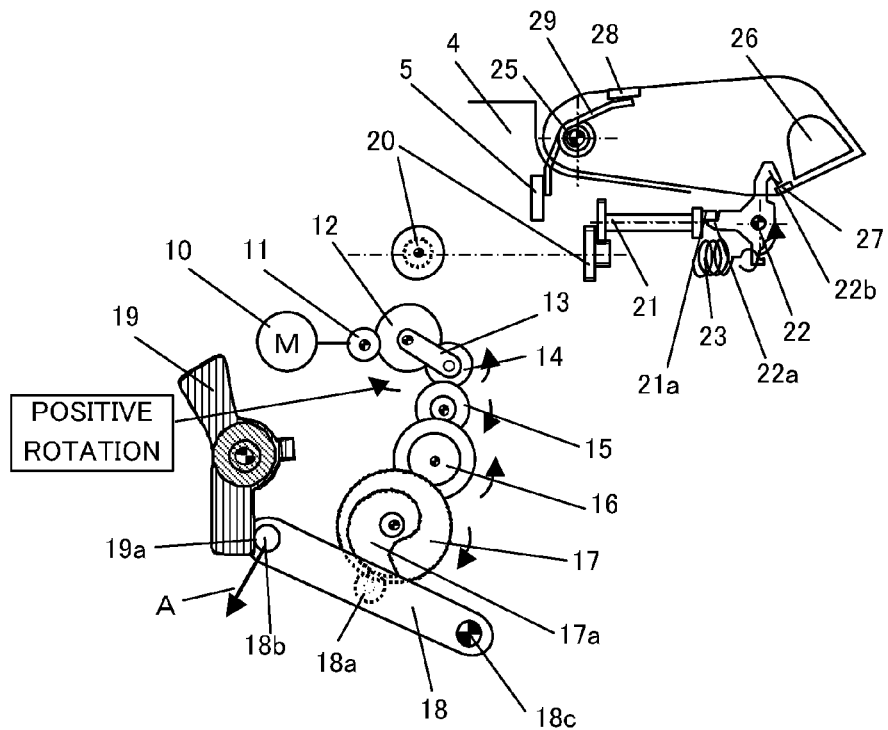
FIGS. 3A to 3D are operational diagrams of a shutter charge mechanism and a flash pop-up mechanism in a normal shooting mode in cameras of Embodiment 1 and 2.
Figure 3B:
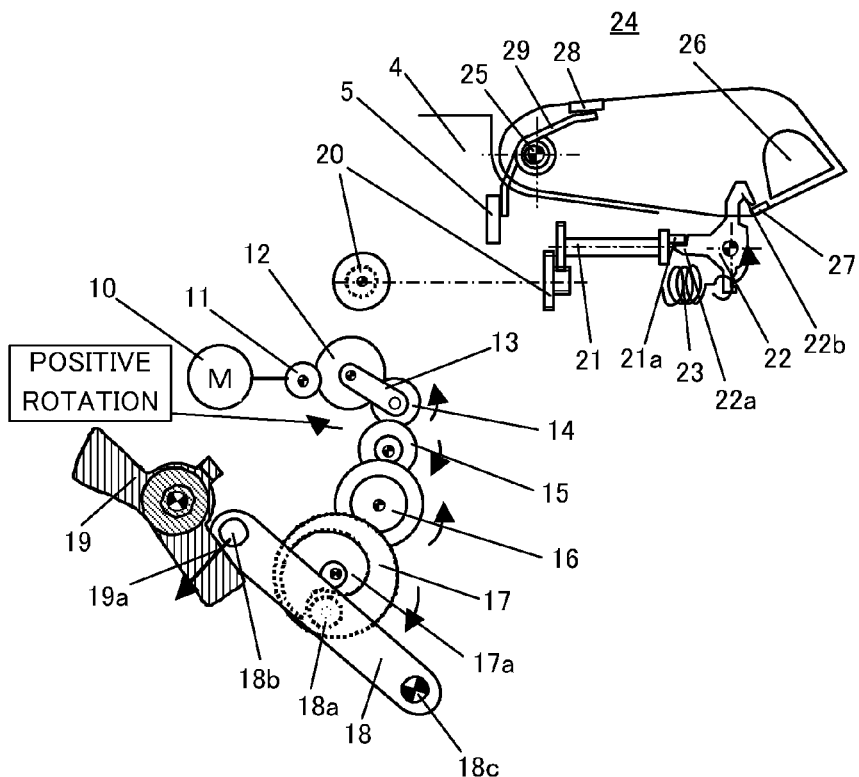
Figure 3C:
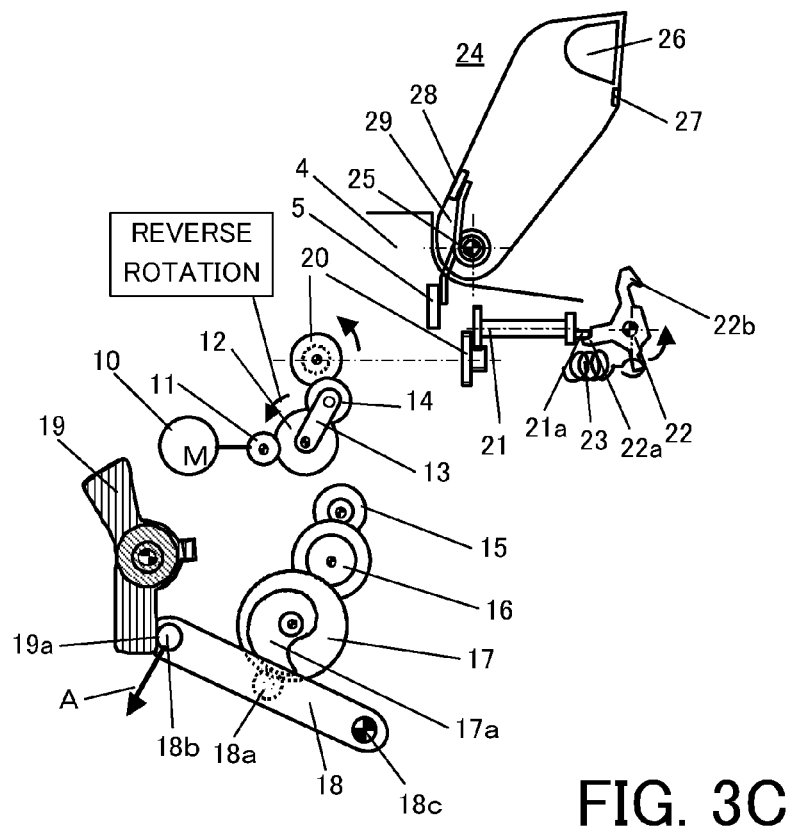
Figure 3D:
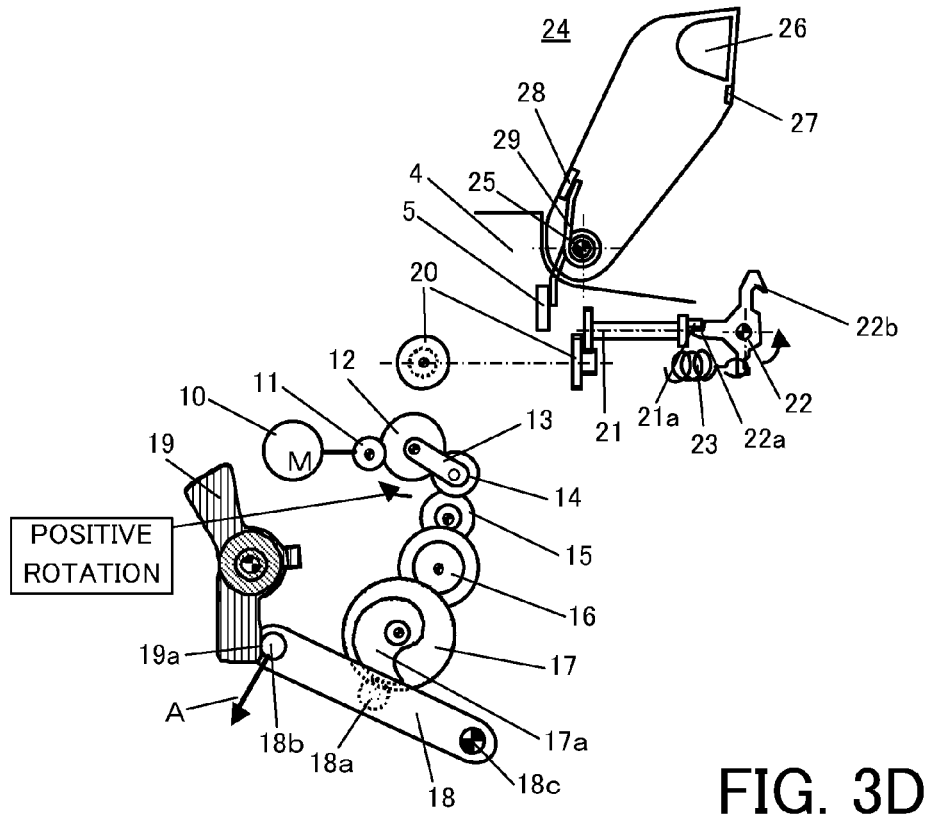

Next, operations of the shutter charge mechanism and the flash pop-up mechanism in the normal shooting mode in the present embodiment will be described. FIGS. 3A to 3D are operational diagrams of the shutter charge mechanism and the flash pop-up mechanism in the normal shooting mode in the camera of the present embodiment. FIG. 3A illustrates a standby state in the normal shooting mode, FIG. 3B illustrates a shutter shooting preparing state in which the shutter blades are movable in the normal shooting mode. FIG. 3C illustrates a state where the built-in flash 24 is popped up in the normal shooting mode, and FIG. 3D illustrates a state obtained after the built-in flash 24 has been popped up in the normal shooting mode.

First of all, the operation in the normal shooting mode will be described. The camera stands by in the state illustrated in FIG. 3A. When the release button (not shown) is pressed to turn on the shooting switch (SW2) in the normal shooting mode, the shutter charge motor 10 rotates in the positive rotation direction. At this time, when the cam gear 17 rotates in a clockwise direction to rotate the charge roller 18a up to a position where it is released from a cam top of the charge cam 17, the phase detector 55 outputs a second phase signal B. The shutter charge motor 10 is controlled so as to stop in accordance with the output of the second phase signal B. This state is the shutter shooting preparing state of FIG. 3B. In this state, the shutter charge lever 19 rotates in a counterclockwise direction by the force of a biasing spring (not shown) to be in a state where the leading blade and the trailing blade of the shutter are movable. Then, when the current is applied from the shutter control circuit 56 to the leading blade driving coil 57 and the trailing blade driving coil 58 at a predetermined time, the leading blade and the trailing blade are moved to perform an exposure operation.

When the exposure operation is finished, the shutter charge motor 10 rotates in the positive rotation direction to drive the pinion gear 11, the sun gear 12, the planet gear 14, the deceleration gears 15 and 16, and the cam gear 17. Then, the shutter charge lever 19 is charged by the charge cam 17a through the charge lever 18. When the charge roller 18a is positioned at the cam top of the charge cam 17a, the phase detector 55 outputs a first phase signal A. The shutter charge motor 10 is controlled so as to stop in accordance with the output of the first phase signal A. This state is the standby state of FIG. 3A.

Next, the operation of a case where the built-in flash is popped up in the normal shooting mode will be described. When the shooting with flash in the normal shooting mode is necessary, the shutter charge motor 10 rotates in the reverse rotation direction, and as illustrated in FIG. 3C, the planet gear 14 engages with the flash driving gear 20. The flash driving gear 20 rotates the hook releasing gear 21 to drive the flash hook 22 in a counterclockwise direction against the hook returning spring to release the flash hook 22 from the locking plate 27 to pop up the built-in flash 24 as illustrated in FIG. 3C.

When the state detecting switch 64 detects the up state of the built-in flash 24, the shutter charge motor 10 reverses the rotation direction to rotate in the positive rotation direction. When the shutter charge motor 10 rotates in the positive rotation direction, the planet gear 14 is released from the flash driving gear 20 to engage with the deceleration gear 15. Then, the shutter charge motor 10 is controlled so as to stop in accordance with the output of the first phase signal A. Accordingly, because the shutter charge motor 10 rotates in the positive rotation direction until the first phase signal A is outputted, the shutter is recharged. This state is the state illustrated in FIG. 3D. At this time, the hook releasing gear 21 stops after rotating by 360 degrees, and the flash hook 22 releases the locking portion 22b from the locking plate 27 and then returns to the state where it locks on the locking plate 27.

After that, when the release button is pressed to turn on the shooting switch (SW2), the shutter charge motor 10 rotates in the positive rotation direction. At this time, when the cam gear 17 rotates in a clockwise direction to rotate the charge roller 18a up to the position where it is released from the cam top of the charge cam 17, the second phase signal B is outputted. The shutter charge motor 10 is controlled so as to stop in accordance with the output of the second phase signal B, and the shutter shooting preparing state illustrated in FIG. 3B is obtained.

Then, the current is applied from the shutter control circuit 56 to the leading blade driving coil 57 and the trailing blade driving coil 58 at a predetermined time, the leading blade of the shutter is moved, and in conjunction with the movement of the leading blade, the built-in flash 24 emits light. After the built-in flash 24 emits the light, the trailing blade is moved to perform the exposure using the built-in flash 24.

When the exposure operation is finished, the shutter charge motor 10 rotates in the positive rotation direction to drive the pinion gear 11, the sun gear 12, the planet gear 14, the deceleration gears 15 and 16, and the cam gear 17. Then, the shutter charge lever 19 is charged by the charge cam 17a through the charge lever 18. When the charge roller 18a is positioned at the cam top of the charge cam 17a, the phase detector 55 outputs the first phase signal A. The shutter charge motor 10 is controlled so as to stop in accordance with the output of the first phase signal A, and the standby state of FIG. 3A is obtained.

In the present embodiment, in accordance with the up state of the built-in flash 24, the shutter charge motor 10 rotates in the positive rotation direction until the phase detector 55 outputs the first phase signal A. Therefore, even if the shooting is interrupted in the up state of the built-in flash 24, the mechanisms from the pinion gear 11 to the cam gear 17 are held to be connected. In the state where the mechanisms from the pinion gear 11 to the cam gear 17 are connected, compared with a state where the planet gear 14 engages with the flash driving gear 20, the displacement of the cam gear 17 can be suppressed when a vibration or the like is applied to the camera.

In the present embodiment, when the planet gear 14 engages with the deceleration gear 15, the shutter charge motor 10 is stopped using the first phase signal A indicating a charge completing position. Therefore, any additional phase signal is not necessary. Furthermore, based on the detection of the up state of the built-in flash 24, the rotation direction of the shutter charge motor 10 is reversed to be in a state where the planet gear 14 engages with the deceleration gear 15. Therefore, compared with a case where the release button is pressed to turn on the shooting switch (SW2) before switching the planet gear 14, the shooting can be performed in a shorter time.

Figure 4A:
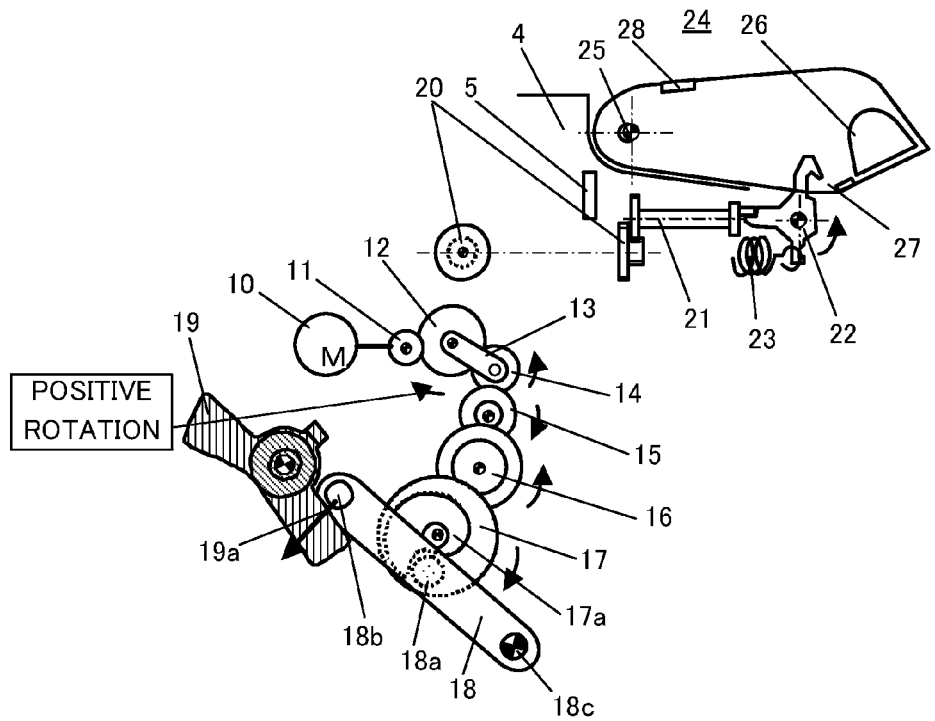
FIGS. 4A to 4C are operational diagrams of a shutter charge mechanism and a flash pop-up mechanism in a live view shooting mode in cameras of Embodiments 1 and 2.
Figure 4B:
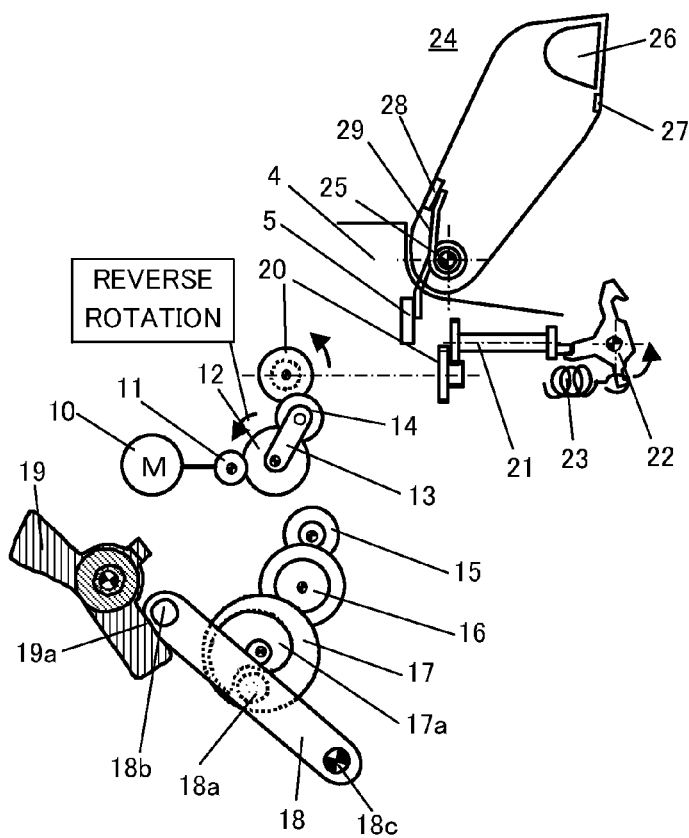
Figure 4C:
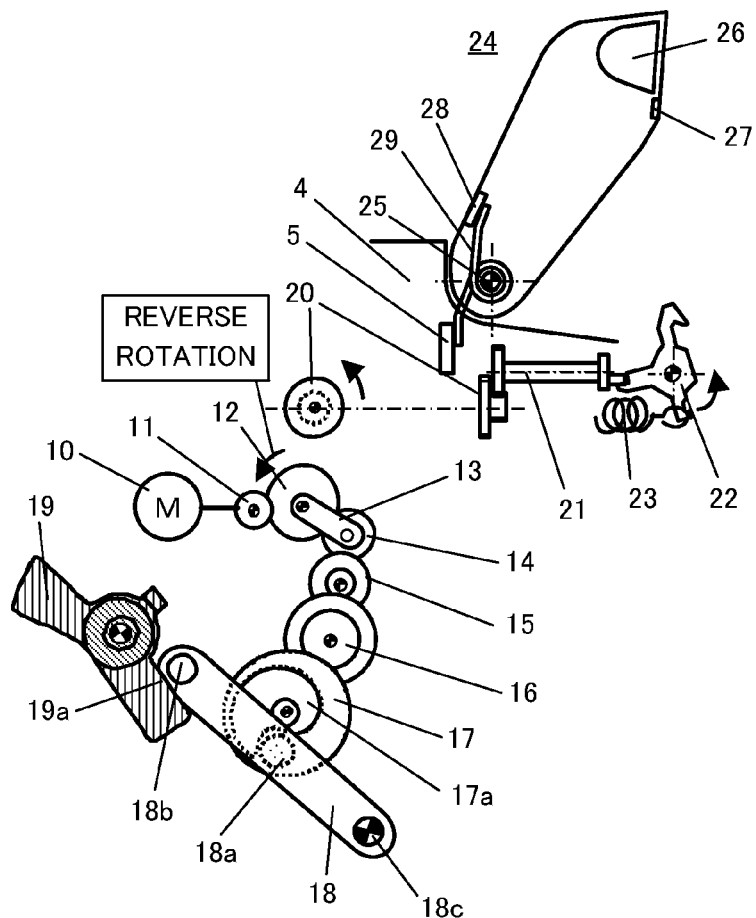

In changing the state of the built-in flash 24 to the down state, when an upper portion of the built-in flash 24 is pressed up to the down position by hand, the locking plate 27 rotates in the counterclockwise direction so as to push away the flash hook 22. Then, the locking portion 22b of the flash hook 22 engages with the locking plate 27 and the state of the built-in flash 24 is changed to the down state. At this time, the state detecting switch 64 detects the down state of the built-in flash 24. Next, referring to FIGS. 4A to 4C, operations of the shutter charge mechanism and the flash pop-up mechanism in the live view shooting mode will be described. FIG. 4A illustrates a state where an object is observed in the live view shooting mode, and FIG. 4B illustrates a state where the built-in flash 24 is popped up in the live view shooting mode. FIG. 4C illustrates a state where the release button is pressed to turn on the shooting switch (SW2) after the built-in flash 24 is popped up (a shutter shooting preparing state immediately before the shutter moves).

When the live view shooting mode is selected, the shutter charge motor 10 starts to rotate in the positive rotation direction in the standby state illustrated in FIG. 3A. When the cam gear 17 rotates in a clockwise direction to rotate the charge roller 18a up to the position where it is released from the cam top of the charge cam 17, the phase detector 55 outputs the second phase signal B. The shutter charge motor 10 is controlled so as to stop in accordance with the output of the second phase signal B. This state is the state illustrated in FIG. 4A. At this time, the shutter charge lever 19 rotates in a counterclockwise direction by the force of the biasing spring (not shown), and the leading blade and the trailing blade of the shutter are movable.

Subsequently, the current is applied from the shutter control circuit 56 to the leading blade driving coil 57. At this time, only the leading blade is moved to introduce an object image into the image pickup element 30, and the object image is displayed on the image monitor 45 in real time in the live view state. When the release button is pressed to turn on the shooting switch (SW2), the shutter charge motor 10 rotates in the positive rotation direction. At this time, the cam gear 17 is driven to return the charge lever 18 using the charge cam 17a to charge the shutter charge lever 19. In this case, since the trailing blade is not moved, only the leading blade is charged.

After that, when the cam gear 17 further rotates up to the state illustrated in FIG. 4A, the second phase signal B is outputted to control the shutter charge motor 10 to stop. Then, when the current is applied from the shutter control circuit 56 to the leading blade driving coil 57 and the trailing blade driving coil 58 at a predetermined time, the leading blade and the trailing blade of the shutter is moved to perform the exposure operation. When the exposure operation is finished, the shutter charge motor 10 rotates in the positive rotation direction, and the cam gear 17 is in the state illustrated in FIG. 4A to output the second phase signal B to control the shutter charge motor 10 to stop. After that, the current is applied from the shutter control circuit 56 to the leading blade driving coil 57 to move only the leading blade to introduce an object image into the image pickup element 30, and the state is changed to the live view state again.

Next, an operation performed when the built-in flash 24 is popped up in the live view shooting mode will be described. When the built-in flash 24 is popped up in the live view state in which an object image is displayed on the image monitor 45 in real time, the shatter charge motor 10 starts to rotate in a reverse rotation direction. When the shutter charge motor 10 rotates in the reverse rotation direction, as illustrated in FIG. 4B, the planet gear 14 engages with the flash driving gear 20.

The flash driving gear 20 rotates the hook releasing gear 21 to drive the flash hook 22 in a counterclockwise direction against the hook returning spring 23. Thus, the flash hook 22 is released from the locking plate 27 to pop up the built-in flash 24 as illustrated in FIG. 4B. When the built-in flash 24 is popped up, the state detecting switch 64 detects the up state of the built-in flash 24.

In the normal shooting mode, when the upstate of the built-in flash 24 is detected, the rotation direction of the shutter charge motor 10 is changed from the reverse rotation direction to the positive rotation direction to drive the shutter charge motor 10 until the first phase signal A is outputted. However, in the live view shooting mode, when the state detecting switch 64 detects the up state of the built-in flash 24, the shutter charge motor 10 is controlled to stop. At this time, since the shutter charge motor 10 does not rotate in the positive rotation direction, the planet gear 14 keeps engaging with the flash driving gear 20.

In the live view shooting mode, when the release button is pressed to turn on the shooting switch (SW2), the shutter charge motor 10 starts to rotate in the positive rotation direction. The cam gear 17 is driven to charge the shutter charge lever 19 through the charge lever 18 by the charge cam 17a. At this time, the trailing blade of the shutter is not moved. Therefore, only the leading blade is charged.

After that, when the cam gear 17 further rotates to be in the shutter shooting preparing state illustrated in FIG. 4C, the second phase signal B is outputted to control the shutter charge motor 10 to stop. Then, when the current is applied from the shutter control circuit 56 to the leading blade driving coil 57 and the trailing blade driving coil 58 at a predetermined time, the leading blade of the shutter is moved to emit light from the built-in flash 24. After the built-in flash 24 emits the light, the trailing blade is moved to perform an exposure operation using the built-in flash 24.

When the exposure operation is finished, the shutter charge motor 10 rotates in the positive rotation direction until the second phase signal B is outputted to leave the charge cam gear 17 in the state illustrated in FIG. 4C. After that, the current is applied from the shutter control circuit 56 to the leading blade driving coil 57 to move only the leading blade to introduce an object image into the image pickup element 30, and the state is changed to the live view state again.

In the live view shooting mode, when an object is displayed on the image monitor 45, the leading blade of the shutter is always moving. Therefore, similarly to the normal shooting mode, when the recharge operation is performed in accordance with the up state of the built-in flash 24, the leading blade of the shutter becomes a state which is shown before the movement, and the live view is interrupted.

When the built-in flash 24 is moved to the downstate by hand and the power supply switch of the camera is turned off without shooting after the built-in flash 24 is popped up in the live view shooting mode, the control is performed as follows. In accordance with turning off the power supply of the camera, the shutter charge motor 10 rotates in the positive rotation direction to control the shutter charge motor 10 to stop in accordance with the output of the first phase signal A before a process of turning off the power supply is performed. Thus, the cam gear 17 is driven up to the standby state illustrated in FIG. 3A before the power supply of the camera is turned off. Therefore, similarly to the normal shooting mode, the mechanisms from the pinion gear 11 to the cam gear 17 are connected. Accordingly, even if a vibration or the like is applied to the camera in a power-off state, the displacement of the cam gear 17 can be suppressed.

Embodiment 2

Hereinafter, Embodiment 2 of the present invention will be described. Embodiment 2 relates to an image pickup apparatus of a single-lens reflex type which performs an image pickup operation using both a focal plane shutter and an electronic shutter, i.e. a hybrid shutter. The operation in a case where such a hybrid shutter is used when an image is taken in the live view shooting mode will be described. The hybrid shutter includes a trailing blade constituted of a mechanical shutter and an electronic shutter (an electronic leading blade) performing a reset scan of a pixel of an image pickup element ahead of the movement of the trailing blade to take an image. A charge accumulation starting scan (hereinafter, referred to as a reset scan) of the image pickup element has a scan pattern adapted for movement characteristics of the mechanical shutter of the trailing blade.

Figure 5:
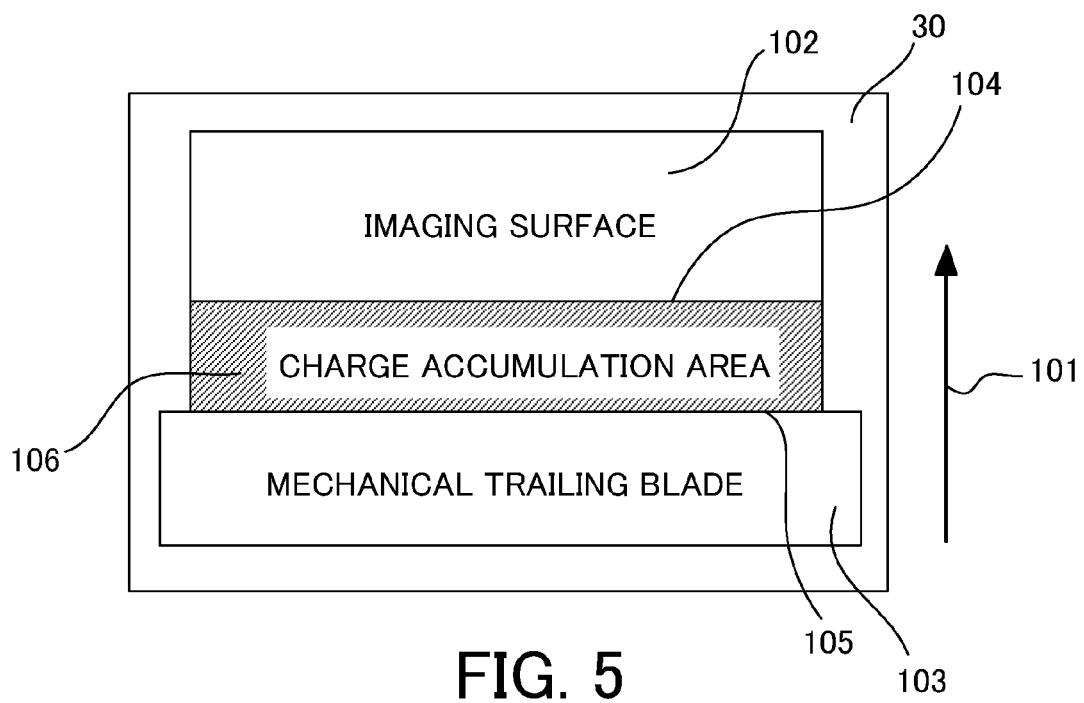
FIG. 5 is an elevation view illustrating a relationship between an electronic leading blade and a mechanical trailing blade in a camera of Embodiment 2.

FIG. 5 is an elevation view of an image pickup element 30 and a trailing blade 103, which illustrates a state which is obtained during performing the reset scan of the electronic leading blade and the movement of the trailing blade 103. An arrow 101 indicates a scanning direction of the reset scan and a read-out scan of the electronic leading blade and a movement direction of the trailing blade. When the reset scan of the electronic leading blade is performed in a shooting operation, an object image formed on an imaging plane of the image pickup element 30 through an imaging lens is upside down. Therefore, the reset scan is performed from a lower side to an upper side of the imaging plane.

Reference numeral 102 denotes an imaging plane of the image pickup element 30. Reference numeral 103 denotes a trailing blade, which shields light passing through areas of apart of the imaging plane 102. Reference numeral 104 denotes a line (a reset line) where charges are reset in the image pickup element 30. The reset line 104 corresponds to an end of the electronic leading blade. An area which is formed by a slit between the reset line 104 and an end 105 of the trailing blade 103 is an area in which a charge accumulation is performed by the exposure in the image pickup element 30 (a charge accumulation area 106).

In a specific pixel in the image pickup element 30, the time required from the passage of the reset line 104, i.e. the start of the reset operation, to the change to a light shielding state formed by the trailing blade 103 is a charge accumulation time by the exposure in the above specific pixel. The start timing of the charge accumulation is different depending upon each row of the image pickup element 30, and the charge accumulation operation at the lowest positioned row in the imaging plane starts first, and the charge accumulation operation at the uppermost row starts last.

Next, a live view shooting when the hybrid shutter is used will be described. When the live view shooting mode is selected, the shutter charge motor 10 starts to rotate in a positive rotation direction in the standby state of FIG. 3A. When the charge roller 18a rotates up to a position where it is released from the cam top of the charge cam 17, the phase detector 55 outputs the second phase signal B. The shutter charge motor 10 is controlled to stop in accordance with the output of the second phase signal B. Thus, the state illustrated in FIG. 4A is obtained. Then, the shutter charge lever 19 rotates in a counterclockwise direction by the force of a biasing spring (not shown) to be in a state where the leading blade and the trailing blade of the shutter are movable. Subsequently, current is applied from the shutter control circuit 56 to the leading blade driving coil 57 to move only the leading blade, and an image object is introduced into the image pickup element 30 to be in the live view state. The above operation is the same as that of Embodiment 1.

When the release button is pressed to turn on the shooting switch (SW2), the reset scan of the electronic leading blade is started. Then, when the current is applied from the shutter control circuit 56 to the trailing blade driving coil 58 so as to obtain a predetermined exposure time, the mechanical trailing blade (the trailing blade 103) is moved to perform the exposure after the passage of the predetermined time.

When the exposure operation is finished, the shutter charge motor 10 rotates in the positive rotation direction until the second phase signal B is outputted and the charge cam gear 17 is changed to the state illustrated in FIG. 4A. Then, the current is applied from the shutter control circuit 56 to the leading blade driving coil 57 to move only the leading blade, and the object image is introduced into the image pickup element 30 to be in the live view state. When the hybrid shutter is used, the time required for actually taking an image after the release button is pressed to turn on the shooting switch (SW2) can be shortened.

Next, the operation when the built-in flash 24 is popped up in the live view shooting in using the hybrid shutter will be described. When the built-in flash 24 is popped up in the live view state, the shutter charge motor 10 starts to rotate in a reverse rotation direction to engage the planet gear 14 illustrated in FIG. 4B with the flash driving gear 20. The flash driving gear 20 rotates the hook releasing gear 21 to release the flash hook 22 from the locking plate 27 to pop up the built-in flash 24 as illustrated in FIG. 4B. The above operation is the same as that of Embodiment 1.

When the release button is pressed to turn on the shooting switch (SW2), the reset scan of the electronic leading blade immediately starts in a case where the hybrid shutter is used. At this time, the flash emits light in conjunction with the reset scan of the electronic leading blade, and when the current is applied from the shutter control circuit 56 to the trailing blade driving coil 58 so as to be a predetermined exposure time, the mechanical trailing blade (the trailing blade 103) moves after the passage of the predetermined time to perform the exposure using the built-in flash 24.

When the exposure operation is finished, the shutter charge motor 10 rotates in the positive rotation direction until the second phase signal B is outputted and the charge cam gear 17 is changed to the state illustrated in FIG. 4A. After that, the current is applied from the shutter control circuit 56 to the leading blade driving coil 57 to move only the leading blade, and the object image is introduced into the image pickup element 30 to be in the live view state. When the hybrid shutter is used, the time required for actually taking an image after the release button is pressed to turn on the shooting switch (SW2) can be shortened. The switching of the planet gear 14 when the built-in flash 24 is popped up is the same as that using a normal mechanical shutter. In other words, in the live view shooting mode, depending upon the up state of the built-in flash 24, the shutter charge motor 10 is only controlled so as to stop rotating in the reverse rotation direction and it does not rotate in the positive rotation direction.

In the present embodiment, with respect to the pop-up operation of the built-in flash 24, the flash hook 22 is released from the locking plate 27 to pop up the built-in flash 24 by a spring force. For example, however, the built-in flash 24 can also be configured so as to be directly popped up using a cam or the like.

According to each of the above embodiments, a camera having a function of a live view shooting mode which suppresses the generation of an error during vibrations and shortens the time required for the exposure can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-196401, filed on Aug. 27, 2009, which is hereby incorporated by reference herein in its entirety.

What is claimed is:

1. An image pickup apparatus comprising:
a motor configured to rotate in a first direction and a second direction opposite to the first direction;
a shutter charge mechanism configured to perform a charge operation of a shutter in a case when the motor rotates in the first direction;
a flash pop-up mechanism configured to move a flash to an up state in a case when the motor rotates in the second direction;
a state detector configured to detect the up state of the flash;
a clutch mechanism configured to decouple a transmission between the motor and the flash pop-up mechanism in a case when the motor rotates in the first direction, and configured to decouple a transmission between the motor and the shutter charge mechanism in a case when the motor rotates in the second direction; and
a controller configured to control the motor so that the motor rotates in the first direction to drive the shutter charge mechanism in a case when the state detector detects the up state of the flash after the motor rotates in the second direction to drive the flash pop-up mechanism.

2. An image pickup apparatus comprising:
a motor configured to rotate in a first direction and a second direction opposite to the first direction;
a shutter charge mechanism configured to perform a charge operation of a shutter in a case when the motor rotates in the first direction;
a flash pop-up mechanism configured to move a flash to an up state in a case when the motor rotates in the second direction;
a shooting switch configured to start a shooting operation;
a clutch mechanism configured to decouple a transmission between the motor and the flash pop-up mechanism in a case when the motor rotates in the first direction, and configured to decouple a transmission between the motor and the shutter charge mechanism in a case when the motor rotates in the second direction; and
a controller configured to control the motor so that the motor rotates in the first direction to drive the shutter charge mechanism in a case when the shooting switch is turned on after the motor rotates in the second direction to drive the flash pop-up mechanism.

3. An image pickup apparatus according to claim 2, further comprising a state detector configured to detect the up state of the flash,
wherein the controller controls the motor to stop in a case when the state detector detects the up state of the flash after the motor rotates in the second direction to drive the flash pop-up mechanism.

4. An image pickup apparatus capable of taking an image in one of a normal shooting mode in which an object image is observed using an optical finder and a live view shooting mode in which the object image is displayed on a monitor, the image pickup apparatus comprising:
a motor configured to rotate in a first direction and a second direction opposite to the first direction;
a shutter charge mechanism configured to perform a charge operation of a shutter in a case when the motor rotates in the first direction;
a flash pop-up mechanism configured to move a flash to an up state in a case when the motor rotates in the second direction;
a state detector configured to detect the up state of the flash;
a shooting switch configured to start a shooting operation;
a clutch mechanism configured to decouple a transmission between the motor and the flash pop-up mechanism in a case when the motor rotates in the first direction, and configured to decouple a transmission between the motor and the shutter charge mechanism in a case when the motor rotates in the second direction; and
a controller configured to control the motor so that the motor rotates in the first direction to drive the shutter charge mechanism in a case when the state detector detects the up state of the flash after the motor rotates in the second direction to drive the flash pop-up mechanism in the normal shooting mode, and configured to control the motor to stop in a case when the state detector detects the up state of the flash after the motor rotates in the second direction to drive the flash pop-up mechanism to control the motor so that the motor rotates in the first direction to drive the shutter charge mechanism in a case when the shooting switch is turned on in the live view shooting mode.

* * * * *